United States Patent [19]

Hatanaka et al.

[11] 4,335,035
[45] Jun. 15, 1982

[54] SILICONE RUBBER COMPOSITION

[75] Inventors: Masayuki Hatanaka, Ouramachi; Atsushi Kurita, Ohta, both of Japan

[73] Assignee: Toshiba Silicone Co., Ltd., Tokyo, Japan

[21] Appl. No.: 173,523

[22] Filed: Jul. 30, 1980

[30] Foreign Application Priority Data

Sep. 11, 1979 [JP] Japan .................. 54-116499

[51] Int. Cl.$^3$ .................. C08L 83/06; C08G 77/12
[52] U.S. Cl. .................. 523/212; 525/478; 528/24; 528/31; 523/213; 524/588
[58] Field of Search .................. 525/478; 528/24, 31; 260/37 SB

[56] References Cited

U.S. PATENT DOCUMENTS

| | | | |
|---|---|---|---|
| 3,050,485 | 8/1962 | Nitzsche et al. | 528/24 |
| 3,696,068 | 10/1972 | Creamer | 528/24 |
| 4,042,643 | 8/1977 | Creasey et al. | 528/31 |
| 4,043,977 | 8/1977 | de Montigny et al. | 525/478 |

FOREIGN PATENT DOCUMENTS 708223  4/1965  Canada .................. 528/24

*Primary Examiner*—Wilbert J. Briggs, Sr.
*Attorney, Agent, or Firm*—Blanchard, Flynn, Thiel, Boutell & Tanis

[57] ABSTRACT

A silicone rubber composition comprising
(A) 100 parts by weight of polyorganosiloxane having the formula:

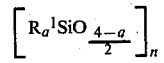

wherein $R^1$ is a substituted or unsubstituted monovalent hydrocarbon group with the proviso that from 0.01 to 0.3% of the $R^1$ groups are vinyl groups, a is a number of from 1.98 to 2.0001, and n is a number of at least 3,000,
(B) 10 to 100 parts by weight of finely divided silica,
(C) more than 5 to 20 parts by weight of a polyorganohydrogensiloxane having the formula:

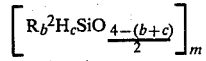

wherein $R^2$ is a substituted or unsubstituted monovalent hydrocarbon group with the proviso that from 0.2 to 2.5% of the $R^2$ groups are vinyl groups, b is a number of from 1.5 to 2.0, c is a number of from 0.01 to 0.5, the value of (b+c) is in the range of from 1.8 to 2.1, and m is a number of from 30 to 3,000, and
(D) 0.01 to 3 parts by weight of organic peroxide.

12 Claims, No Drawings

SILICONE RUBBER COMPOSITION

The present invention relates to a heat-curable silicone rubber composition. More particularly, the present invention relates to a composition which provides a silicone rubber having a high tear strength and an excellent heat resistance when it is cured.

Since a silicone rubber retains elastomeric characteristics within a broad temperature range, it is widely used for the manufacture of packings, gaskets, tubes, wire coatings and insulators. However, since the tear strength of silicone rubber is lower than those of organic rubbers, application of silicone rubber to fields where high mechanical strength, especially high tear strength, is required, is limited. As means for increasing the tear strength of silicone rubber, there has been proposed a method in which a polyorganosiloxane fluid and/or gum having a high vinyl group content is incorporated into a polyorganopolysiloxane gum having a low vinyl group content (see Japanese Patent Publications No. 16544/72, No. 10633/73 and No. 15459/73). However, this method is defective in that because the proportion of vinyl groups in the total organic groups of the entire polysiloxane composition becomes higher, the heat resistance of the resulting silicone rubber becomes lower. Furthermore, since there are used large amounts of vinyl group-containing siloxane units, the synthesis of which is relatively complicated and expensive, a silicone rubber having a high tear strength cannot be prepared economically advantageously according to this method.

We have discovered that a silicone rubber having a high tear strength and an excellent heat resistance can be obtained, while eliminating the foregoing disadvantages, by incorporating in a conventional polyorganosiloxane gum, a polyorganohydrogensiloxane in which from 0.2 to 2.5% of the total organo groups bonded to the silicon atom(s) are vinyl groups. We have now completed the present invention based on this discovery.

Several proposals have been made for incorporating a polyorganohydrogensiloxane in a heat-curable silicone rubber. However, the objects of those proposals are different from the object of the present invention, and none of those proposals suggest that a high tear strength can be obtained by the crosslinking mechanism of the present invention. More specifically, those proposals teach a method in which hydrosilylation is carried out by using a platinum catalyst in combination with a polyorganohydrogensiloxane (see, for example, Japanese Patent Publication No. 31476/69), a method in which a silicone rubber excellent in heat resistance and steam resistance, which need not be post-cured, is obtained by using a calcium compound in combination with a polyorganohydrogensiloxane (see Japanese Patent Application Laid-Open Specification No. 93658/73), a method in which discoloration is prevented by incorporating a polyorganohydrogensiloxane (see Japanese Patent Application Laid-Open Specification No. 40050/78), and a method in which aromatic acyl and alkyl peroxides are used together as an organic peroxide component in combination with a polyorganohydrogensiloxane in order to prevent stickiness on the surface after hot air vulcanization (see Japanese Patent Application No. 115366/77). However, none of those proposals discloses that if a polyorganohydrogensiloxane having both vinyl groups and hydrogen atoms bonded to the silicon atoms in the molecule, as specified in the present invention, is incorporated in a polyorganosiloxane gum, a silicone rubber having a high tear strength can be obtained by curing with an organic peroxide.

In accordance with the present invention, there is provided a silicone rubber composition comprising (A) 100 parts by weight of polyorganosiloxane represented by the following general formula:

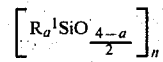

wherein $R^1$ stands for a substituted or unsubstituted monovalent hydrocarbon group, with the proviso that from 0.01 to 0.3% of the $R^1$ groups are vinyl groups, a is a number of from 1.98 to 2.001, and n is a number of at least 3,000, (B) 10 to 100 parts by weight of finely divided silica, (C) more than 5 to 20 parts by weight of a polyorganohydrogensiloxane represented by the following general formula:

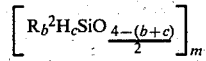

wherein $R^2$ stands for a substituted or unsubstituted monovalent hydrocarbon group with the proviso that from 0.2 to 2.5% of the $R^2$ groups are vinyl groups, b is a number of from 1.5 to 2.0, c is a number of from 0.01 to 0.5, the value of (b+c) is in the range of from 1.8 to 2.1, and m is a number of from 30 to 3,000, and (D) 0.01 to 3 parts by weight of an organic peroxide.

The polyorganosiloxanes customarily used for preparing conventional silicone rubbers can be used as the component (A) in the present invention. Such polyorganosiloxane consists essentially of diorganosiloxy units, but it can include small amounts of triorganosiloxy units, monoorganosiloxy units and $SiO_2$ units. The molecule can be terminated by any of hydroxyl and triorganosiloxy groups. The organic group $R^1$ bonded to the silicon atom is selected from substituted and unsubstituted monovalent hydrocarbon groups. For example, there can be mentioned alkyl groups such as methyl, ethyl, propyl, butyl, amyl, hexyl, octyl, decyl and dodecyl groups, alkenyl groups such as a vinyl group, aralkyl groups such as a β-phenylethyl group, aryl groups such as a phenyl group, and substituted hydrocarbon groups such as cyanoethyl and 3,3,3-trifluoropropyl groups. In order to obtain a silicone rubber possessing excellent physical properties and heat resistance and to synthesize the starting material easily, it is preferred that the groups $R^1$ are composed of vinyl groups in a range of amount as described hereinafter, up to 10% of phenyl groups and the remainder are methyl groups. From the viewpoint of easiness in the synthesis and in order to obtain a rubber having excellent properties, it is especially preferred that the groups $R^1$ consist of vinyl and methyl groups. When low-temperature resistance, radiation resistance or transparency is required, good results are obtained when up to 10% of phenyl groups are present. When oil resistance is required, the presence of cyanoethyl or 3,3,3-trifluoropropyl groups is recommended. The vinyl groups readily cause a crosslinking reaction, in the presence of an organic peroxide. The number of vinyl groups is from 0.01 to 0.3%, preferably 0.01 to 0.1%, based on the total number of the groups $R^1$. If the number of vinyl groups is less than 0.01%, curing with various organic peroxides under appropriate conditions becomes impossible. If the number of vinyl groups is excessive, the heat resistance and tear strength of the cured silicone rubber are reduced. The value of a is selected in the range of from 1.98 to 2.001 and is substantially 2 in many cases. If the value of a is less than 1.98, control of the synthesis of such a polyorganosiloxane becomes difficult, and if the value of a is larger than 2.001, a desired average polymerization degree cannot be obtained. The average polymerization degree is at least 3,000, preferably in the range of from 5,000 to 10,000. If the value of n is less than 3,000, satisfactory mechanical strength cannot be obtained, and if the value of n exceeds 10,000, the processability at the filler-mixing step and other process steps is reduced.

In the present invention, the finely divided silica (B) is incorporated in the composition to impart good mechanical properties, such as appropriate hardness and tensile strength, to the resulting silicone rubber. For example, there can be mentioned reinforcing silica, such as fumed silica, ignited silica or precipitated silica. It is preferred that such silica be pretreated with an organosilicon compound such as a linear polyorganosiloxane, cyclic polydiorganosiloxane or hexamethyldisilazane. By the use of such surface-treated silica, suitable electric properties and transparency can be imparted to the cured products and the tear strength can be improved. These finely divided silicas can be used singly or in the form of a mixture of two or more of them.

The amount of the finely divided silica (B) is from 10 to 100 parts by weight, preferably 25 to 70 parts by weight, per 100 parts by weight of the polyorganosiloxane (A). If the amount of the finely divided silica is less than 10 parts by weight or more than 100 parts by weight, per 100 parts by weight of the component (A), a satisfactory tear strength cannot be obtained.

The polyorganohydrogensiloxane (C) that is used in the present invention is a characteristic component of the composition of the present invention. It has a linear or slightly branched structure which has vinyl groups and hydrogen atoms bonded to the same or different silicon atoms in one polyorganohydrogensiloxane molecule. As the groups $R^2$, there can be mentioned the same groups as mentioned above with respect to the group $R^1$. For the reasons set forth above with respect to $R^1$, the organic groups, other than the vinyl groups, preferably consist essentially of up to 10% of phenyl groups and the remainder are methyl groups. It is especially preferred that the organo groups, other than the vinyl groups, be entirely methyl groups. The vinyl group content is from 0.2 to 2.5%, based on the total number of $R^2$ groups. If the vinyl group content is less than 0.2%, a sufficient tensile strength is not obtained, and if the vinyl group content exceeds 2.5%, the heat resistance is reduced. The number c of hydrogen atoms bonded to the silicon atom or atoms in the molecule is 0.01 to 0.5, per silicon atom, on the average. Such hydrogen atoms can be present in the form of any of diorganohydrogensiloxy unit, an organohydrogensiloxy unit and the like. From the viewpoint of easiness in the synthesis, the organic groups of such siloxy units are ordinarily methyl groups. If the value of c is less than 0.01, a satisfactory tear strength cannot be obtained, and if the value of c exceeds 0.5, the heat resistance is reduced. The value of b is selected so that the value of (b+c) is in the range of from 1.8 to 2.1, and the value of b is practically in the range of from 1.5 to 2.0. If the value of (b+c) is less than 1.8, the synthesis of the polyorganohydrogensiloxane is difficult, and if the value of (b+c) exceeds 2.1, a desired average polymerization degree cannot be obtained. The terminal groups of the molecule can be hydroxyl groups, alkoxy groups, triorganosiloxy groups or diorganohydrogensiloxy groups. The average polymerization degree is 30 to 3,000, preferably 300 to 3,000. If the value of m is less than 30, a polyorganohydrogensiloxane having the desired controlled vinyl group content cannot be obtained, and either the tear strength or the heat resistance is reduced. The large is the value of m, the more improved is the rubber elasticity, but synthesis of the polyorganohydrogensiloxane in which the value of m exceeds 3,000 is difficult.

The amount of the polyorganohydrogensiloxane (C) is more than 5 to 20 parts by weight, preferably 7 to 15 parts by weight, per 100 parts by weight of the polyorganosiloxane (A). If the amount of the component (C) is 5 parts or less by weight, per 100 parts by weight of the component (A), a satisfactory effect of improving the tear strength cannot be attained, and if the amount of the component (C) exceeds 20 parts by weight, per 100 parts by weight of the component (A), the heat resistance is reduced.

Any organic peroxide conventionally used for peroxide curing-type silicone rubbers can be used as the organic peroxide (D) in the present invention. For example, there can be mentioned benzoyl peroxide, bis(2,4-dichlorobenzoyl) peroxide, di-tert-butyl peroxide, 2,5-dimethyl-2,5-di-tert-butylperoxyhexane, tert-butyl perbenzoate, tert-butylperoxyisopropyl carbonate and dicumyl peroxide. The amount of the organic peroxide (D) is 0.01 to 3 parts by weight, preferably 0.05 to 1 part by weight, per 100 parts by weight of the polyorganosiloxane (A). If the amount of the component (D) is less than 0.01 part by weight, per 100 parts by weight of the component (A), curing is not sufficiently performed, and even if the component (D) is added in an amount exceeding 3 parts by weight, per 100 parts by weight of the component (A), no substantial increase of the curing effect can be attained, resulting in economical disadvantages, and furthermore, the decomposition product of the organic peroxide remains in the silicone rubber and has bad influences on the characteristics of the silicone rubber, especially the heat resistance.

The composition of the present invention consists essentially of the above-mentioned components (A) to (D). But other additives can be added in order to attain special properties. For example, in order to improve the hardness of the cured silicone rubber, a filler having a relatively large particle size, such as pulverized silica or diatomaceous earth, can be used in combination with the finely divided silica, according to the conventional technique adopted in the art of heat-curable silicone rubbers. However, in order to obtain a silicone rubber having a high tear strength, it is preferred not to use such a filler having a large particle size in a large amount. Furthermore, a heat resistance-improving agent, such as iron oxide, ferrite, zinc oxide, barium oxide, titanium oxide, magnesium oxide, cerium hydroxide or an organic acid salt of iron or cerium, a coloring agent such as carbon black or titanium oxide, and a process aid such as a low-molecular-weight polyorganosiloxane can be conveniently added.

As compared with a conventional composition formed by blending a polyorganosiloxane having a high vinyl group content in a polyorganosiloxane gum having a low vinyl group content, the silicone rubber composition of the present invention provides a silicone rubber having a comparable or superior tear strength and a higher heat resistance with a lower total vinyl group content. Furthermore, in the silicone rubber composition of the present invention, the necessary amount of the organic peroxide is much smaller than in the conventional composition, and therefore, the bad influences of the decomposition products of the residual organic peroxide, such as reduction of the heat resistance and steam resistance, can be remarkably ameliorated.

The silicone rubber of the present invention can be used for the manufacture of gaskets, artificial nipples, plug-boots, electric wire coatings and tubings, for which high tear strength and excellent heat resistance are required.

The present invention will now be further described in detail by reference to the following illustrative Examples. In the Examples, all references to "parts" mean parts by weight. In the Tables given in the Examples, H, Ts, E and Tr(B) represent the hardness, tensile strength, elongation and tear strength (Die B), respectively, each measured according to Japanese Industrial Standards (JIS) K6301. The test condition P indicates post curing at 200° C. for four hours and the test condition HR indicates this post curing followed by heat aging at 250° C. for 24 hours.

EXAMPLE 1

A polyorganohydrogensiloxane as set forth in Table 1, 50 parts of fumed silica which had been surface treated with siloxane, 1 part of titanium oxide and 3.0 parts of α,ω-dimethoxypolydimethylsiloxane having a viscosity of 30 cSt at 25° C. were mixed in a dough mixer with 100 parts of a dimethylvinylsiloxy terminated polyorganosiloxane consisting of 0.1 mole % of methylvinylsiloxy units and 99.9 mole % of dimethylsiloxy units and having an average degree of polymerization of 5,000, whereby to form base compositions 11 and 12 according to the invention, a comparative base composition 13 and a comparative base composition 14 free of the polyorganohydrogensiloxane, respectively. Then, 0.5 part of 2,5-dimethyl-2,5-di-tert-butylperoxyhexane was added into the base by a two-roll mill, each composition was then press-cured at 170° C. for 10 minutes to obtain a silicone rubber sheet having a thickness of 2 mm. Post curing was conducted at 200° C. for 4 hours. As is apparent from the results shown in Table 1, silicone rubber having a high tear strength was obtained according to the invention. The post-cured sample was subjected to the heat resistance test at 250° C. for 24 hours. As is seen from the results shown in Table 1, the silicone rubber obtained from the base composition of the present invention retained high physical properties.

TABLE 1

| | Sample No. | | | | | | | |
|---|---|---|---|---|---|---|---|---|
| Polyorgano-hydrogensiloxane | 11 (Invention) | | 12 (Invention) | | 13 (Comparison) | | 14 (Comparison) | |
| Terminal group | $Me_3SiO_{\frac{1}{2}}$ | | $Me_3SiO_{\frac{1}{2}}$ | | $Me_3SiO_{\frac{1}{2}}$ | | | |
| MeH siloxy units, % | 6 | | 3 | | 10 | | | |
| MeVi siloxy units, % | 2 | | 3 | | — | | — | |
| $Me_2$ siloxy units, % | 92 | | 94 | | 90 | | | |
| Average polymerization degree | 2,700 | | 2,000 | | 2,000 | | | |
| Amounts (parts) | 7 | | 7 | | 7 | | | |
| Test Conditions | P | HR | P | HR | P | HR | P | HR |
| Physical Properties | | | | | | | | |
| H (JIS) | 57 | 60 | 50 | 56 | 63 | 65 | 57 | 61 |
| Ts, kg/cm² | 96 | 76 | 95 | 96 | 93 | 48 | 96 | 82 |
| E, % | 670 | 630 | 760 | 710 | 560 | 200 | 720 | 510 |
| Tr(B), kg/cm | 53 | 23 | 41 | 36 | 30 | 11 | 21 | 17 |

Note:
Me: methyl group
Vi: vinyl group

EXAMPLE 2

30 parts of fumed silica and 2 parts of iron oxide were mixed into 100 parts of a trimethylsiloxy terminated polyorganosiloxane gum consisting of 0.1 mole % of methylvinylsiloxy units and 99.9 mole % of dimethylsiloxy units and having an average degree of polymerization of 7,000, and the mixture was kneaded with heating at 150° C. for 6 hours in a dough mixer to obtain a base composition. A polyorganohydrogensiloxane as set forth in Table 2 was added by a two-roll mill into the base composition, and 0.8 part of a 1:1 (by weight) mixture of benzoyl peroxide and methylsilicone fluid was further added by a two-roll mill to form a composition 21 according to the invention and a comparative composition 22. Each of the thus obtained compositions was press-cured at 120° C. for 10 minutes to obtain a silicone rubber sheet having a thickness of 2 mm. The physical properties of the sample post-cured at 200° C. for 4 hours and the sample subjected to a heat treatment at 250° C. for 24 hours after this post curing are shown in Table 2.

TABLE 2

| | Sample No. | | | |
|---|---|---|---|---|
| Polyorganohydrogensiloxane | 21 (Invention) | | 22 (Comparison) | |
| Terminal group | $Me_2HSiO_{\frac{1}{2}}$ | | $Me_2HSiO_{\frac{1}{2}}$ | |
| MeVi siloxy units, % | 1 | | 10 | |
| MeH siloxy units, % | 20 | | 10 | |
| $Me_2$ siloxy units, % | 79 | | 80 | |
| Average polymerization degree | 200 | | 200 | |
| Amount (parts) | 6 | | 6 | |
| Test Conditions | P | HR | P | HR |
| Physical Properties | | | | |
| H (JIS) | 45 | 48 | 46 | 55 |
| Ts, kg/cm² | 98 | 82 | 92 | 44 |
| E, % | 540 | 410 | 580 | 180 |

TABLE 2-continued

| Tr(B), kg/cm | 43 | 21 | 32 | 11 |
|---|---|---|---|---|

Note
Me: methyl group
Vi: vinyl group

EXAMPLE 3

40 parts of siloxane-treated fumed silica, 3 parts of precipitated silica and 3 parts of a methoxy terminated polyorganosiloxane consisting of 30 mole % of diphenylsiloxy units and 70 mole % of dimethylsiloxy units and having a viscosity of 25 cSt at 25° C. were thoroughly mixed into 100 parts of a hydroxyl terminated polydiorganosiloxane gum consisting of 0.15 mole % of methylvinylsiloxy units, 5 mole % of diphenylsiloxy units and 94.85 mole % of dimethylsiloxy units to obtain a base composition. Then, 5.5 parts of a trimethylsiloxy terminated polyorganohydrogensiloxane consisting of 1 mole % of methylvinylsiloxy units, 40 mole % of methylhydrogensiloxy units and 59 mole % of dimethylsiloxy units and having a viscosity of 100 cSt at 25° C. was added to the base composition, and 0.3 part of di-tert-butyl peroxide was further added to form a final composition. The final composition was press-cured at 170° C. for 10 minutes to form a silicone rubber sheet having a thickness of 2 mm. The sheet was post-cured at 200° C. for 4 hours, and was then subjected to the heat resistance test at 250° C. for 24 hours. The obtained results are shown in Table 3.

TABLE 3

| | Test Conditions | |
|---|---|---|
| | P | HR |
| H, (JIS) | 51 | 53 |
| Ts, kg/cm² | 104 | 88 |
| E, % | 670 | 510 |
| Tr(B), kg/cm | 39 | 25 |

EXAMPLE 4

100 parts of a dimethylvinylsiloxy terminated polyorganosiloxane gum consisting of 0.05 mole % of methylvinylsiloxy units and 99.95 mole % of dimethylsiloxy units and having an average degree of polymerization of 6,500 was mixed in a dough mixer, with 60 parts of siloxane-treated fumed silica and 5 parts of α,ω-dimethoxypolydimethylsiloxane having a viscosity of 25 cSt at 25° C. and 0.01 part of iron octoate was further added. Then, 8 parts of a methoxy terminated polyorganohydrogensiloxane consisting of 4 mole % of methylvinylsiloxy units, 6 mole % of methylhydrogensiloxy units, 5 mole % of diphenylsiloxy units and 85 mole % of dimethylsiloxy units and having a viscosity of 2,600 cSt at 25° C. was added into the above mixture to obtain a base composition. Then, 0.15 part of tert-butylcumyl peroxide was blended into the base composition by a two-roll mill to form a final composition. This final composition was press-cured at 170° C. for 10 minutes to obtain a silicone rubber sheet having a thickness of 2 mm. The sheet was post-cured at 200° C. for 4 hours, and was then subjected to the heat resistance test at 250° C. for 24 hours. The properties of the sample after the post curing and the sample after the heat resistance test are shown in Table 4.

TABLE 4

| | Test Conditions | |
|---|---|---|
| | P | HR |
| H (JIS) | 64 | 66 |
| Ts, kg/cm² | 85 | 83 |
| E, % | 530 | 460 |
| Tr(B), kg/cm | 55 | 27 |

The embodiments of the invention in which an exclusive property or privilege is claimed are defined as follows:

1. A silicone rubber composition consisting essentially of
(A) 100 parts by weight of polyorganosiloxane having the formula:

$$\left[ R_a^1 SiO_{\frac{4-a}{2}} \right]_n$$

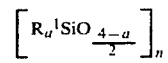

wherein $R^1$ is a substituted or unsubstituted monovalent hydrocarbon group, with the proviso that from 0.01 to 0.3% of the total $R^1$ groups are vinyl groups, a is a number of from 1.98 to 2.001, and n is a number of at least 3,000,
(B) 10 to 100 parts by weight of finely divided silica,
(C) from more than 5 parts by weight up to 20 parts by weight of polyorganohydrogensiloxane having the formula:

$$\left[ R_b^2 H_c SiO_{\frac{4-(b+c)}{2}} \right]_m$$

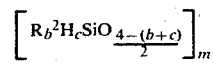

wherein $R^2$ is a substituted or unsubstituted monovalent hydrocarbon group with the proviso that from 0.2 to 2.5% of the total $R^2$ groups are vinyl groups, b is a number of from 1.5 to 2.0, c is a number of from 0.01 to 0.5, the value of (b+c) is in the range of from 1.8 to 2.1, and m is a number of from 30 to 3,000, and
(D) 0.01 to 3 parts by weight of an organic peroxide effective for curing silicone rubber compositions.

2. A composition as set forth in claim 1 wherein from 0.01 to 0.1% of the total number of $R^1$ groups are vinyl groups.

3. A composition as set forth in claim 1 wherein 0 to 10% of the $R^1$ groups are phenyl groups, and the remainder of the $R^1$ groups are methyl groups.

4. A composition as set forth in claim 1 wherein the remainder of the $R^1$ groups are methyl groups.

5. A composition as set forth in claim 1 wherein n is a number of from 5,000 to 10,000.

6. A composition as set forth in claim 1 wherein the finely divided silica is one having its surface treated with an organosilicon compound.

7. A composition as set forth in claim 1 or claim 3 wherein 0 to 10% of the $R^2$ groups are phenyl groups and the remainder of $R^2$ groups are methyl groups.

8. A composition as set forth in claim 1 or claim 4 wherein the remainder of the $R^2$ groups are methyl groups.

9. A composition as set forth in claim 1 wherein m is a number of from 100 to 3,000.

10. A composition as set forth in claim 1 wherein the amount of the component (C) is 7 to 15 parts by weight.

11. A composition as set forth in claim 1 wherein the amount of the component (D) is 0.05 to 1 part by weight.

12. A composition as set forth in claim 1 wherein the remainder of the $R^1$ groups are methyl groups, the remainder of the $R^2$ groups are methyl groups and the amount of the component (C) is 7 to 15 parts by weight.

* * * * *